(No Model.) 7 Sheets—Sheet 1.

G. L. THIELL.
APPARATUS FOR CONTROLLING THE ADMISSION OF AIR TO FURNACES.

No. 515,377. Patented Feb. 27, 1894.

Fig 1.

(No Model.) 7 Sheets—Sheet 3.
G. L. THIELL.
APPARATUS FOR CONTROLLING THE ADMISSION OF AIR TO FURNACES.
No. 515,377. Patented Feb. 27, 1894.

(No Model.) 7 Sheets—Sheet 4.

G. L. THIELL.
APPARATUS FOR CONTROLLING THE ADMISSION OF AIR TO FURNACES.

No. 515,377. Patented Feb. 27, 1894.

Fig 5.

-WITNESSES-
Dan'l Fisher
George Hemsley

-INVENTOR-
George Landu Thiell,
by Geo. W. T. Mead, atty.

(No Model.) 7 Sheets—Sheet 5.
G. L. THIELL.
APPARATUS FOR CONTROLLING THE ADMISSION OF AIR TO FURNACES.
No. 515,377. Patented Feb. 27, 1894.

Fig 6.

WITNESSES
Dan'l Fisher
George Hemsley

INVENTOR
George Landu Thiell,
by W. T. Howard, atty.

(No Model.) 7 Sheets—Sheet 6.

G. L. THIELL.
APPARATUS FOR CONTROLLING THE ADMISSION OF AIR TO FURNACES.

No. 515,377. Patented Feb. 27, 1894.

WITNESSES
Dan'l Fisher
George Hemsley

INVENTOR
George Landur Thiell
by G. W. T. Howard, atty.

(No Model.) 7 Sheets—Sheet 7.

G. L. THIELL.
APPARATUS FOR CONTROLLING THE ADMISSION OF AIR TO FURNACES.

No. 515,377. Patented Feb. 27, 1894.

WITNESSES
Dan'l Fisher
George Hemsley

INVENTOR
George Lander Thiell,
by W. T. Howard,
atty.

THE NATIONAL LITHOGRAPHING COMPANY,
WASHINGTON, D. C.

UNITED STATES PATENT OFFICE.

GEORGE LANDER THIELL, OF BALTIMORE, MARYLAND, ASSIGNOR TO THE THIELL COMBUSTION GOVERNOR AND MANUFACTURING COMPANY, OF SAME PLACE.

APPARATUS FOR CONTROLLING THE ADMISSION OF AIR TO FURNACES.

SPECIFICATION forming part of Letters Patent No. 515,377, dated February 27, 1894.

Application filed April 19, 1893. Serial No. 470,998. (No model.)

*To all whom it may concern:*

Be it known that I, GEORGE LANDER THIELL, of the city of Baltimore and State of Maryland, have invented certain Improvements in Apparatus for Controlling the Admission of Air to Furnaces, of which the following is a specification.

In Letters Patent No. 490,177, granted to me on the 17th day of January, 1893, and in my pending applications, Serial Nos. 454,740 and 467,449, I show and describe apparatus wherein a diaphragm having one side thereof exposed to the gases in the combustion chamber of a boiler furnace, and the other to the atmosphere, is connected by certain levers and rods to the damper lever, to operate it. In such an arrangement the only power to operate the damper, is that consequent upon change in the relative pressures of the gases in the combustion chamber, and the atmosphere; and to obtain sufficient force to readily move the damper with a very slight alteration in the said relative pressures, the diaphragm has to be large, and large diaphragms are objectionable in many respects.

In the present invention I am enabled to reduce the size of the diaphragm, by operating the damper directly by a steam or water motor, and only operate the valve which controls the admission of steam or water to the motor, by means of the diaphragm. With this arrangement, a small diaphragm only is required, or one of sufficient power only, to operate the motor valve with a very slight variation in the relative pressures of the gases and the air.

In the description of the said invention which follows, reference is made to the accompanying drawings forming a part hereof, and in which—

Figure 1:
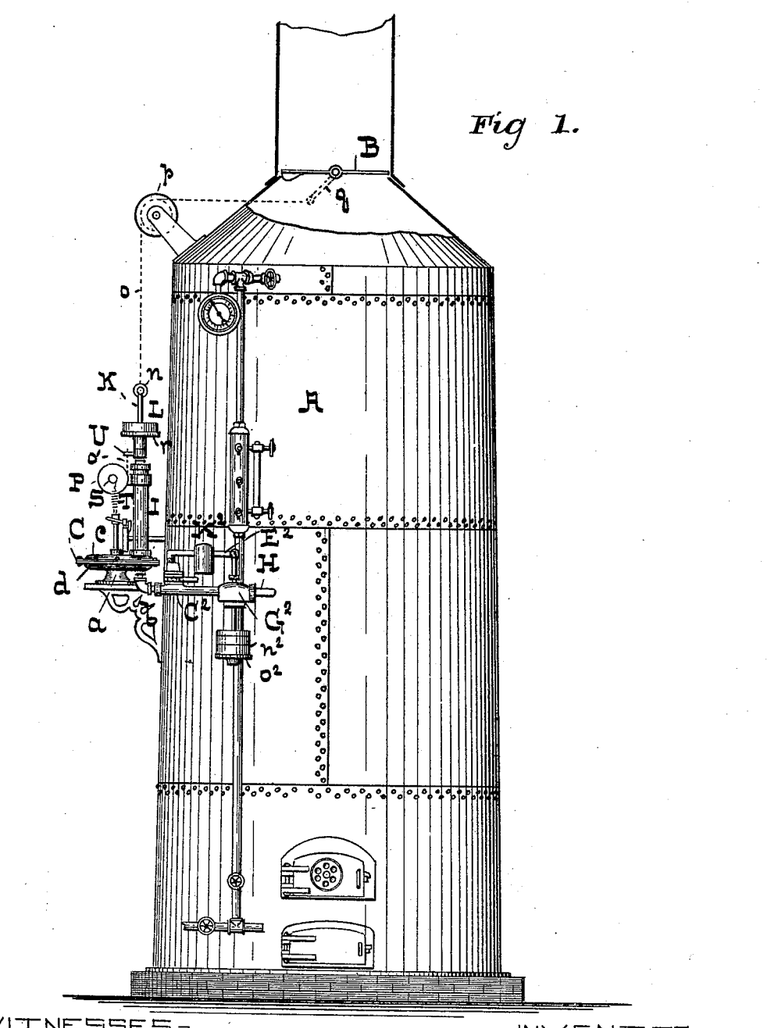
Figure 1 is a partly sectional side view of an upright water tube boiler provided with the present invention.

Referring now to Fig. 1 of the drawings, A is an ordinary vertical water tube boiler, and B the chimney damper the movement of which under circumstances hereinafter described, is the ultimate object of the invention.

Figures 3, 4:
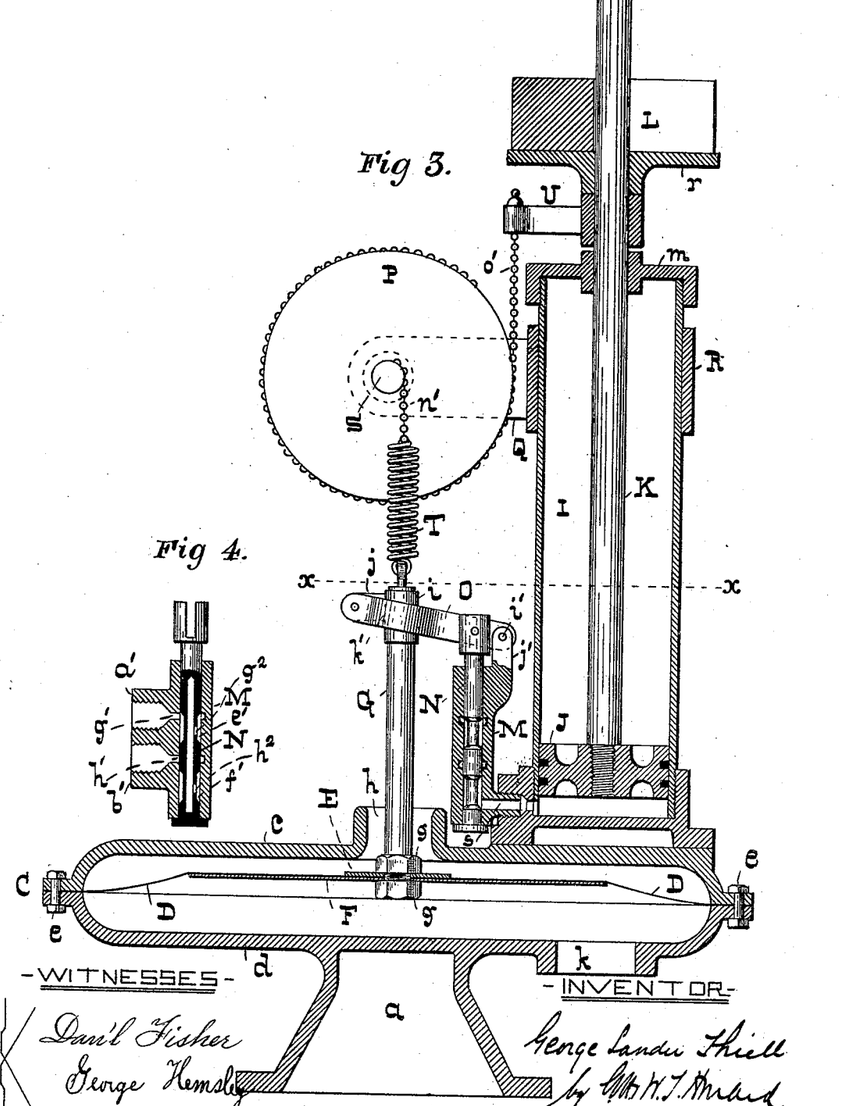
Figs. 3, 4, 5, 6 and 7, are details of the apparatus on a further enlarged scale.

Referring now particularly to Fig. 3 of the drawings, which is a sectional side view of the principal parts of the apparatus, C is a box in two parts or sections, having a suitable stand $a$ whereby it is supported. In the present case, the stand rests on a shelf $b$ (shown only in Fig. 1) projecting from the side of the boiler. Between the two parts or sections $c$ and $d$ of the box C, is a flexible diaphragm D held in place by bolts $e$ which also hold the two sections $c$ and $d$ together. This diaphragm may be made of any suitable material, but cotton duck treated with rubber is preferred.

Figure 5:
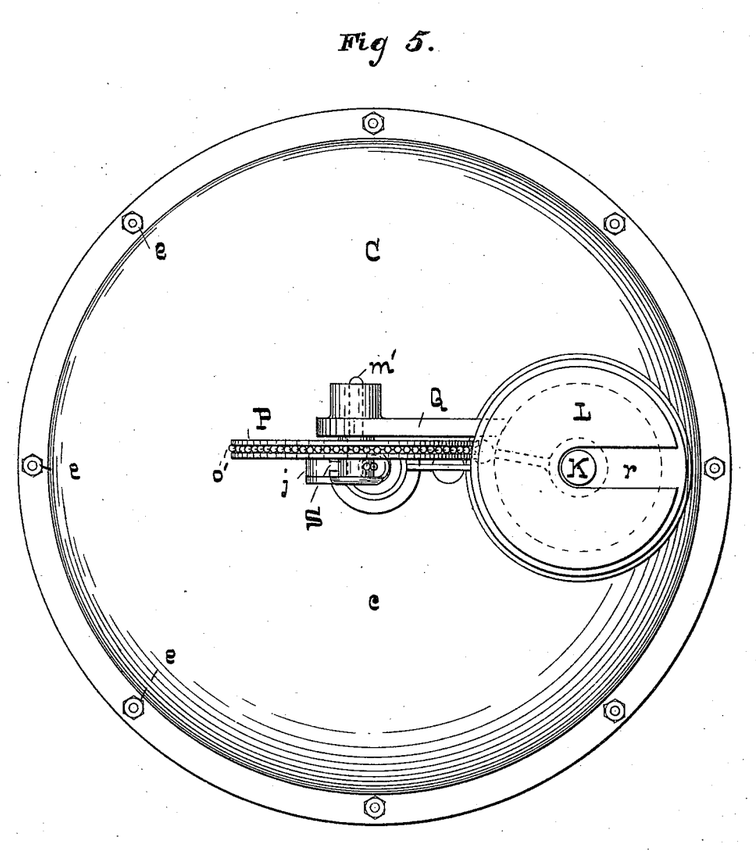
Figure 6:
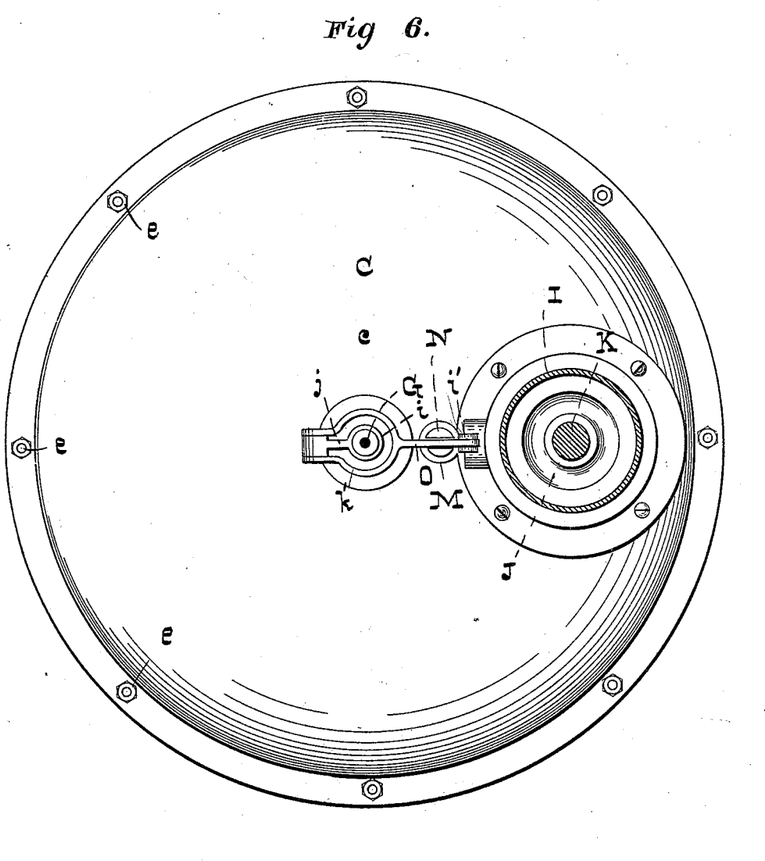

Fig. 5 is a top view of Fig. 3; and Fig. 6 a section of Fig. 3 taken on the dotted line $x-x$.

E and F are circular metallic plates secured, respectively, to the top and bottom of the diaphragm D.

G is a stem held to the plates E and F, and also to the diaphragm D, by the nuts $g$. This stem passes through an aperture $h$ in the top section $c$ of the box C, and its head is provided with a collar $i$ having an arm $j$ extending laterally from one side thereof.

Figure 2:
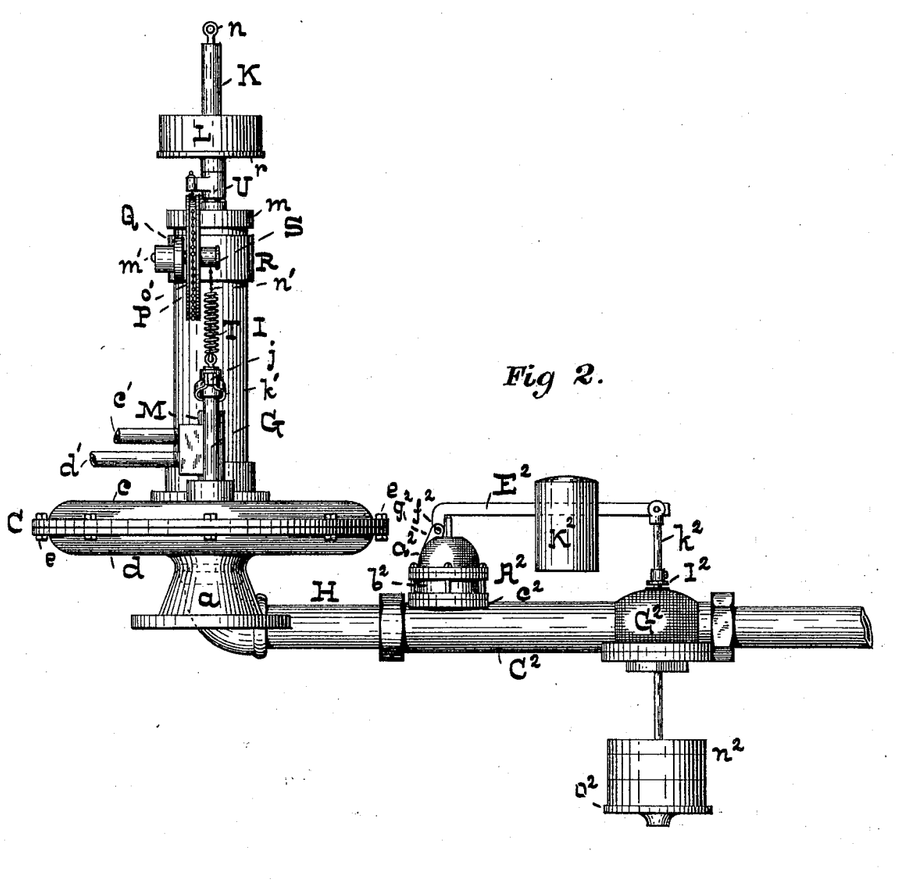
Fig. 2 is an enlarged exterior view of the apparatus alone, as seen from a point removed ninety degrees from that taken in Fig. 1.
Figure 7:
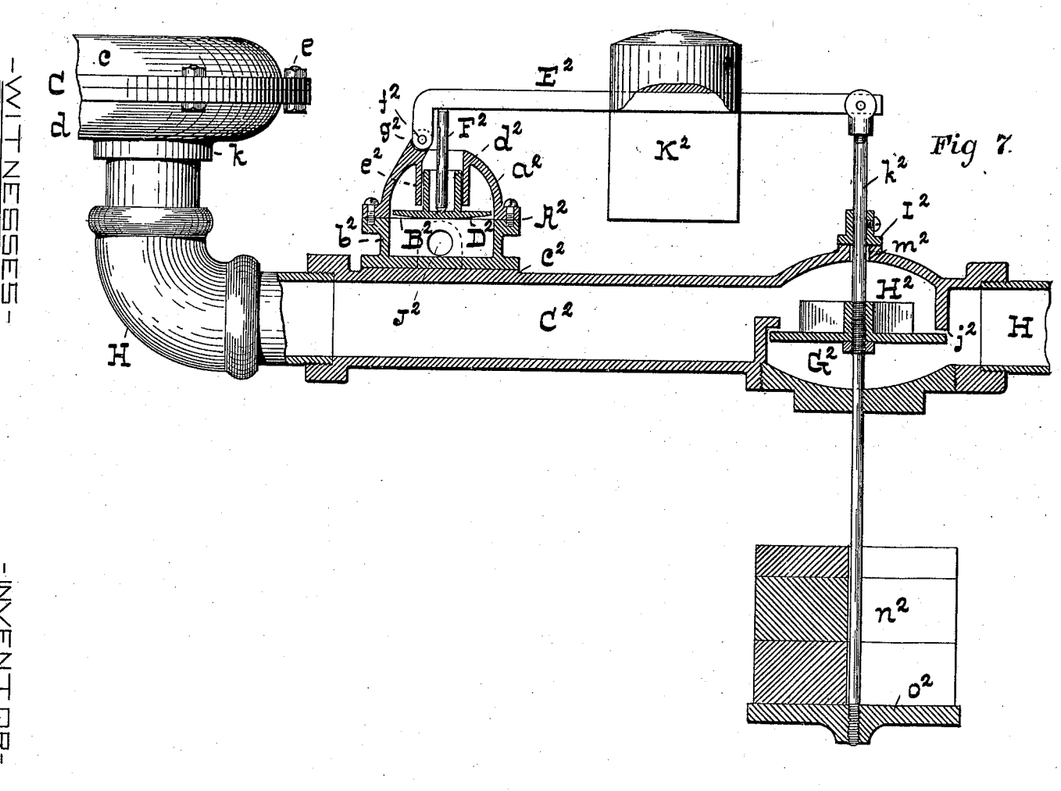

The lower section of the box C is connected with the interior of the furnace of the boiler A, or to the combustion chamber thereof, by a pipe H, shown only in Figs. 1, 2 and 7. The nozzle $k$ for the said pipe is, however, shown also in Fig. 3.

I is a steam or water cylinder, erected, by preference, on the top of the section $c$ of the box C, and near to the center thereof.

J is a piston in the cylinder I having a rod K which passes through the cylinder head $m$ at the upper end of the cylinder. The end of this piston rod is provided with an eye $n$ or any other suitable appliance, whereby it is connected to a chain $o$, which passes over a pulley $p$, and is attached to the damper lever $q$. The length of this chain is such that when the piston J is at the bottom of the cylinder I the damper is closed.

L is a weight seated on a plate $r$ on the piston rod K, and it is of such size as to close the damper B when the piston J is not sustained by steam or water. In other words, the closing of the damper is effected by the gravity of the weight L.

In the present case, the damper B is weighted at one side so as to automatically open when the chain $o$ is slackened by the rise of the piston J in the cylinder I. In some applications of this invention to boilers, the damper is opened by a system of rods and levers, and in such cases, the force of the upwardly moving piston rod is used to open the damper.

M is a valve chest having a nozzle $s$ screwed into the wall of the cylinder I at a point below the piston J. This valve chest is bored out for the reception of the hollow cylindrical valve N hereinafter more particularly described, and it has the nozzles $a'$ and $b'$ into which are screwed, respectively, the waste pipe $c'$ leading to a sewer and the steam or water pipe $d'$ which in the present case is intended for water and connected to the service pipe of the water supply. These pipes are shown only in Fig. 2, but the nozzles for them are illustrated in Fig. 4. The valve N has two annular grooves $e'$ and $f'$ which serve to bring into communication, under certain circumstances hereinafter described, the ports $g'$ and $h'$ which lead to the nozzles $a'$ and $b'$, and also to place the nozzle $s$ in communication with either of the ports $g'$ or $h'$ through the medium of the apertures $g^2$ and $h^2$ leading into the interior of the valve N as hereinafter described.

Fig. 4 shows the valve chest, and valve, as seen from a different point of view.

The upper end of the valve N is slotted and in this slot is placed a lever O fulcrumed at $i'$ to a bracket $j'$ projecting from the valve chest M. This lever terminates in a yoke $k'$ which straddles the collar $i$ and is pivoted to the arm $j$ which is a part of the said collar.

P is a grooved pulley adapted to revolve on a stud $m'$ projecting from an arm Q which extends from a band R which is around the cylinder I. This grooved pulley has a smaller flanged pulley S formed on its outer face and to this latter pulley is attached a chain $n'$ fastened to the upper end of a spiral spring T having its lower end secured to the head of the stem G by means of an adjusting eye screwed into the stem G. Another chain $o'$ leads from the grooved circumference of the pulley P to which it is fastened, to an arm U on the piston rod K and situated immediately below the weight holding plate $r$.

Supposing the boiler to be in use, and the furnace door open so that the pressure of the gases in the combustion chamber is equal to that of the air, the diaphragm D assumes the elevated position shown in Fig. 3 and the valve N is raised. The valve N being in its highest position, the port $h'$ leading to the water supply pipe $d'$ is closed and the space below the piston J in the cylinder I is in communication with the outlet or discharge pipe $c'$ by means of the nozzle $s$, the annular groove $f'$, the aperture $h^2$, the central passage in the valve N, the aperture $g^2$, the annular groove $e'$ and the port $g'$. From this it will be seen that no water under pressure can remain under the piston J to sustain it, and the piston is held down by the weight L and the damper B kept closed by the chain $o$. Upon the closing of the furnace door, the pressure in the combustion chamber is reduced, and the diaphragm D consequently depressed, and in the depression of the diaphragm the valve N is lowered until its head strikes the top of the valve chest M. The port $g'$ leading to the discharge pipe $c'$ is thus closed, and the port $h'$ opened or uncovered by the valve N. Water entering the port $h'$ passes to the annular groove $e'$, thence through the aperture $g^2$, the central channel of the valve N, thence through the aperture $h^2$ to the annular groove $f'$ and thence to the nozzle $s$ leading to the under side of the piston J. The piston is then raised by the incoming water and the damper opened. As the piston rod K with its arm U rises, the chain $o'$ is drawn which turns the pulley P and effects the winding of the chain $n'$ on the small pulley S. This winding of the chain $n'$ extends the spring T, and when the tension on the said spring overcomes the resistance of the diaphragm, the diaphragm D is slightly raised and by this motion, the flow of water to the cylinder I cut off. All further movement of the damper while the same relative pressures of gases and air on the diaphragm are maintained, is thus prevented, as no more water can enter the cylinder to elevate the piston, and that already therein cannot escape until by a change in the relative pressures of the gases and air on the diaphragm, the valve N is again moved. For instance, should the fire require still more air the pressure in the combustion chamber becomes less, and the diaphragm is further depressed by the practically increased pressure of the atmosphere. The depression of the diaphragm causes the valve N to be again lowered, and the port $h'$ to be again uncovered and this serves to admit more water to underneath the piston J and that device is therefore further elevated which slackens the chain $o$ and the damper being loaded is automatically opened. This further opening of the damper continues until in the winding of the chain $n'$ and the extension of the spring T, the downward movement of the diaphragm is arrested and the valve N elevated so as to cut off all further entrance of water, as before described. But should the fire require less air, instead of more, owing to the formation of bare spaces on the grate bars, through which spaces air enters the furnace, the pressure in the combustion chamber is increased, and the diaphragm raised which causes the valve N to uncover the port $g'$ which operation admits of the escape of water from under the piston J and that device being for the time unsupported by water under pressure, it is lowered by the gravity of the weight L, and the damper somewhat closed by the drawing of the chain $o'$.

From the foregoing, it will be understood that owing to the elasticity of the spring T which is an element of the connecting mechanism between the piston rod K, and the diaphragm D, the valve N is so adjusted that the damper when placed in a certain position is held thereat until a different ratio of pressures of the gases and air, is established, when an adjustment of the damper is promptly made, and the new position of the damper maintained, until another change is required.

Figures 8, 9:
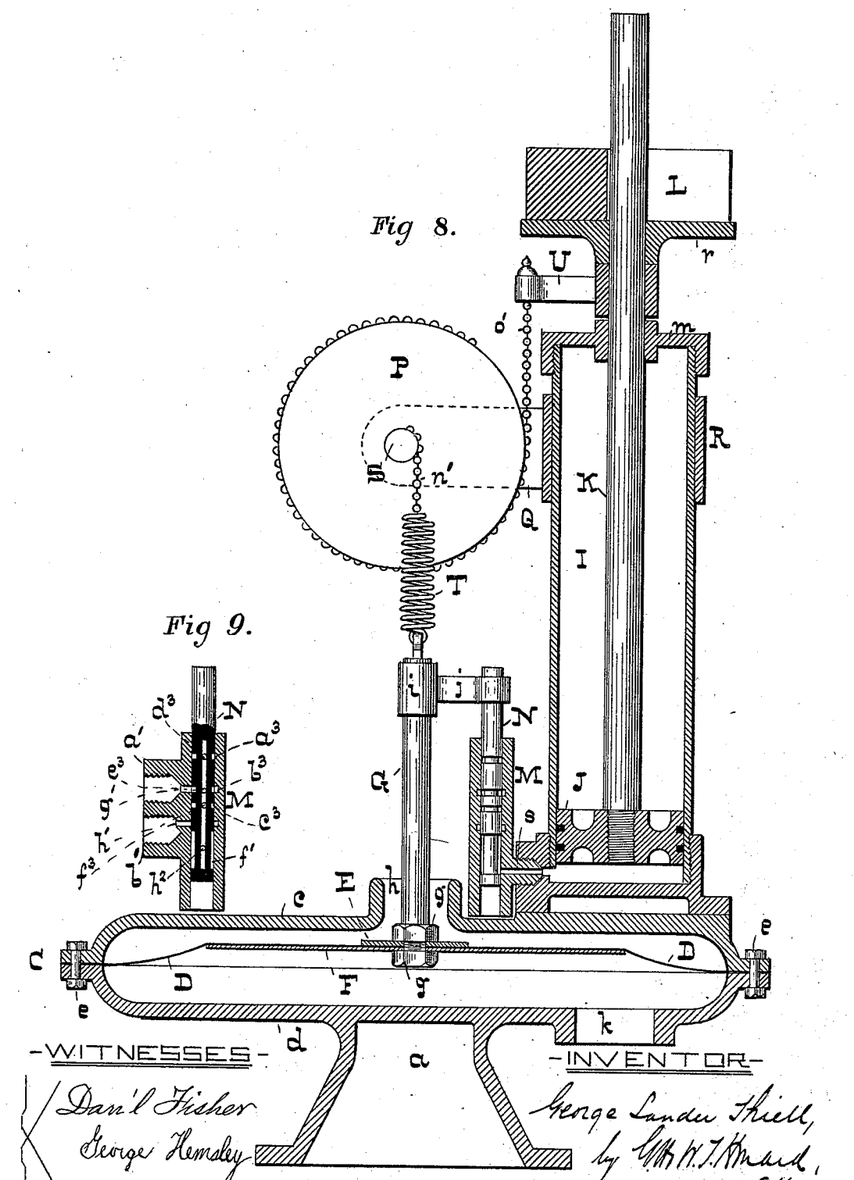
Figs. 8 and 9 illustrate a modification in the construction of certain parts of the apparatus, as hereinafter described.

Figs. 8 and 9 correspond with Figs. 3 and 4, except that the valve N is lifted directly by the arm $j$, instead of by the lever O connected to the said arm. With this alternate construction, the valve N has a motion in common with the diaphragm D, and the accurate adjustment of the damper by the operation of the said valve as described, is not effected to the same extent. It is applicable however for use in cases where a uniform quantity of fuel is applied to the furnace, as where the fuel consists of oil or gas, and the flow controlled by valves or cocks. In such applications, the draft in the chimney must be uniform notwithstanding changes in temperature of the air, velocity of the wind, or in the density of the atmosphere. To effect this uniform draft in the chimney, the valve chest M is provided with the ports $g'$ and $h'$ before described, but the valve N is furnished with annular ports $a^3$, $b^3$ and $c^3$ which are in communication with the interior of the valve by means of holes $d^3$, $e^3$, and $f^3$. It has also the annular groove $f'$ and the aperture $h^2$ before described.

Supposing the diaphragm D, and the valve N to be in the positions shown, the discharge port $g'$ is open, for the reason that the nozzle $s$ is in communication with the annular groove $f'$, aperture $h^2$, the central channel in the valve, the hole $c^3$ and the port $b^3$ leading to the port $g'$. When the furnace door is closed, the diaphragm is depressed until the port $c^3$ of the valve N, comes into alignment with the port $h'$, when water from the port $h'$ enters the port $c^3$ and passes through the hole $f^3$ into the central channel, thence through the aperture $h^2$, the annular groove $f'$, and the nozzle $s$ to the under side of the piston which piston is then raised and the damper opened. The upward movement of the piston continues until the tension on the spiral spring T overcomes the pressure on the diaphragm D, when the valve N is raised until the ports $g'$ and $h'$ are covered, and further movement of the piston is prevented. Should the draft in the chimney be suddenly increased by a gust of wind, the diaphragm falls rapidly, and the valve N being moved down to its lowest position, the port $a^3$ comes in alignment with the port $g'$, and through the medium of the hole $d^3$, water is discharged as before described from the under side of the piston J, and the damper closed. As soon as the gust of wind is over the diaphragm rises and water is admitted to the cylinder to open the damper by means of the ports, holes, and channels before described.

In my pending applications, Serial Nos. 454,740 and 467,499, I show and describe a steam or water motor which is put in operation by the rise of steam pressure in the boiler to a prearranged height, and which then so influences the connecting mechanism between the flexible diaphragm which is subjected at its two sides to the action of the air, and the gases in the combustion chamber, and the damper, that the damper is closed independently of the said diaphragm. In the present invention, I dispense with such motor and adapt the diaphragm itself to close the damper. I effect this result by cutting off all communication between the space under the diaphragm, and the combustion chamber, and opening the said space to the air. By this arrangement the pressures on the two sides of the diaphragm are equalized, and the damper is closed by the same means that it would be if the condition of the fire in the furnace required it. In carrying out this second part of my invention, I employ a small box $A^2$ in two parts or sections, $a^2$ and $b^2$ and secure between them a flexible diaphragm $B^2$, see Fig. 7, in which the said box is shown as attached to a seat $c^3$ formed as a part of the valve shell $C^2$ placed in and forming a part of the pipe H. On the diaphragm $B^2$, I place a loose plate $D^2$ having a central upper projection $d^2$ turned to fit in a guide $e^2$ in the upper section $a^2$. $E^2$ is a lever fulcrumed at $f^2$ to a lug $g^2$ on the section $a^2$ of the box $A^2$, and between this lever and the top of the plate $C^2$, is a stem $F^2$, the ends of which are pointed to reduce friction in any movement of the parts. A part of the shell $C^2$ is adapted as a valve chamber $G^2$ and provided with a valve $H^2$ which closes in its upward motion, against a seat $j^2$. The upper end of the stem $k^2$ of the valve $H^2$ passes through an opening $m^2$ in the top of the chamber $G^2$ which opening is somewhat larger than the stem. The top of the stem $k^2$ is hinged to the lever $E^2$. $I^2$ is a valve on the stem $k^2$ to close the opening $m^2$ when the valve $H^2$ is opened. The lower end of the said stem is weighted, the weights $n^2$ resting on a plate $o^2$ into which the stem is screwed. Steam from the boiler is introduced to the lower part $b^2$ of the box $A^2$ and below the diaphragm $B^2$ by means of a pipe $J^2$. The weights $n^2$ are approximately such as to be overcome and lifted when the steam pressure on the under side of the diaphragm $B^2$ reaches the prearranged height, and allow the valve $H^2$ to be drawn to its seat. A very close adjustment of the load on the valve $B^2$ is, however, effected by the weight $K^2$ adapted to slide on the lever $E^2$. All communication between the space under the diaphragm D and the combustion chamber being thus cut off by the closing of the valve H², and air admitted to the pipe H by the uncovering of the aperture m² an equilibrium of pressure on the diaphragm D is established and the damper is closed, through the operation of the mechanism before described. As soon as the pressure in the boiler falls below the maximum limit, the weights n² again open the valve H², and the fire in the furnace is again regulated by the automatic alteration in the position of the chimney damper before described.

It would be possible to substitute an electric motor for the steam or water one described, to operate the damper, and in such case the diaphragm stem G would be required to make and break the electric circuit, instead of actuate the valve N, and such substitution of electricity for steam or water is within the scope of the present invention.

I claim as my invention—

1. In combination with a furnace, and a damper which controls the combustion of fuel in the furnace, a motor to operate the said damper, a diaphragm one side of which is exposed to the gases in the said furnace and the other to the air, and means to connect the said diaphragm to the said motor whereby in the movement of the said diaphragm, consequent upon changes in the relative pressures on the two sides thereof, the said motor is either put into operation or stopped, substantially as, and for the purpose specified.

2. In combination with a furnace, and a damper which controls the combustion of fuel in the furnace, a steam or water cylinder having a piston with a rod which is connected to the said damper, valve mechanism to control the entrance of steam or water to the said cylinder and to the piston therein, and also the discharge of steam or water from the said cylinder, and a diaphragm having one side thereof exposed to the gases in the furnace and the other to the atmosphere adapted to operate the said valve mechanism, substantially as, and for the purpose specified.

3. In combination with a furnace, and a damper which controls the combustion of fuel in the furnace, a water cylinder having a piston therein connected to the said damper, an arm on the said piston rod with a chain leading therefrom to the periphery of a pulley, another pulley of smaller diameter attached to the first having a chain connected by an elastic device to a diaphragm having one side thereof exposed to the gases in the said furnace and the other to the atmosphere, valve mechanism to control the entrance of water to, and the discharge of water from, the said cylinder, and suitable mechanism to convey motion from the said diaphragm to the said valve mechanism, substantially as, and for the purpose specified.

4. In combination with a boiler and a furnace, and a damper which controls the combustion of fuel in the said furnace, a diaphragm one side of which is exposed to the gases in the furnace and the other exposed to the atmosphere, connected by means of suitable mechanism to the said damper, so that its movement influenced by any change in the relative pressures of the gases and the atmosphere, will operate the damper, a valve which when closed, cuts off the communicating passage between the furnace and the said diaphragm, and a steam operated device to close the said communicating valve, upon the steam pressure in the boiler rising to a pre-arranged height, the whole operating to close the damper upon the steam attaining the maximum pressure, independently of the pressure of the gases in the furnace, substantially as specified.

5. In combination with a boiler, and a furnace, and a damper which controls the combustion of fuel in the said furnace, a diaphragm having one side open to the gases in the furnace by means of a pipe, and the other side exposed to the action of the atmosphere, a valve situated in the said connecting pipe adapted when closed to close the said connecting pipe to the gases and open it to the air, a weighted steam operated diaphragm or valve connected to the said connecting valve, whereby in the increase of steam pressure in the boiler to a pre-arranged tension, the said weighted diaphragm is raised and the connecting valve closed, and an equilibrium of pressure on the two sides of the said diaphragm established, and the damper closed, substantially as and for the purpose specified.

6. In combination with a diaphragm having a space underneath it in communication with the interior of a boiler furnace by means of a pipe, and its upper surface exposed to the action of the atmosphere, mechanism to communicate the motion of the diaphragm to the chimney damper, a valve in the said connecting pipe, a steam operated diaphragm having a weighted lever connected to the said connecting valve, and an air valve to admit air to the interior of the connecting pipe as the connecting valve is closed, whereby upon the steam in the boiler rising to a pre-arranged height, all communication between the space under the diaphragm and the interior of the furnace is stopped, and the said space brought into communication with the air, substantially as, and for the purpose specified.

GEORGE LANDER THIELL.

Witnesses:
GEO. E. TAYLOR,
DANL. FISHER.